United States Patent
Koster et al.

(10) Patent No.: US 11,023,612 B2
(45) Date of Patent: Jun. 1, 2021

(54) OPERATOR ISOLATION BASED ON DATA SECURITY REQUIREMENTS

(71) Applicant: International Business Machines Corporation, Armonk, NY (US)

(72) Inventors: David M. Koster, Reston, VA (US); Jason A. Nikolai, Rochester, MN (US); John M. Santosuosso, Rochester, MN (US); Michael J. Branson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 16/144,449

(22) Filed: Sep. 27, 2018

(65) Prior Publication Data

US 2020/0104527 A1 Apr. 2, 2020

(51) Int. Cl.
*G06F 7/04* (2006.01)
*G06F 21/62* (2013.01)
(Continued)

(52) U.S. Cl.
CPC ...... *G06F 21/6245* (2013.01); *G06F 21/6227* (2013.01); *H04L 63/0428* (2013.01); *H04L 67/10* (2013.01)

(58) Field of Classification Search
CPC . G06F 21/6245; G06F 21/6227; H04L 67/10; H04L 63/0428
(Continued)

(56) References Cited

U.S. PATENT DOCUMENTS

| 8,272,061 B1 * | 9/2012 | Lotem ................. H04L 63/1433 726/25 |
| 9,537,898 B2 | 1/2017 | Billau et al. |

(Continued)

OTHER PUBLICATIONS

Wright, J., "Packet Payloads, Encryption and Bacon", [online] Nov. 29, 2010, [Retrieved on Jan. 13, 2020], Retrieved from the Internet at <URL: http://www.packetstan.com/2010/11/packet-payloads-encryption-and-bacon.html>, 7 pp.

(Continued)

*Primary Examiner* — Amare F Tabor
(74) *Attorney, Agent, or Firm* — Konrad Raynes Davda & Victor LLP; Janaki K. Davda

(57) ABSTRACT

Provided are techniques for operator isolation based on data security requirements. At a cloud node, a graph is received that includes ingest portions of data and operators. For each of the operators, it is determined whether the operator processes protected data. In response to determining that the operator is tagged with an indication that the operator processes protected data, the operator is forwarded to a tenant secure node for processing. In response to determining that the operator is not tagged with an indication that the operator processes protected data, the operator is forwarded to a tenant general node for processing. Then, while the tenant general node is processing the operator, in response to determining that the operator is processing protected data a tag is associated with the operator to indicate that the operator processes protected data and the operator is forwarded to the tenant secure node for processing.

20 Claims, 9 Drawing Sheets

(51) Int. Cl.
  *H04L 29/08* (2006.01)
  *H04L 29/06* (2006.01)
(58) Field of Classification Search
  USPC .......................................................... 726/27
  See application file for complete search history.

(56) References Cited

U.S. PATENT DOCUMENTS

| | | | | |
|---|---|---|---|---|
| 9,747,466 | B2* | 8/2017 | Beckman | G06F 21/6227 |
| 10,333,963 | B2* | 6/2019 | Pope | G06F 21/577 |
| 10,341,373 | B2* | 7/2019 | Bhatkar | H04L 63/1425 |
| 10,397,274 | B2* | 8/2019 | Manasse | H04L 63/06 |
| 10,574,444 | B2* | 2/2020 | Khristi | H04L 63/0823 |
| 10,742,313 | B1* | 8/2020 | Favarolo | H04B 7/18578 |
| 10,749,880 | B2* | 8/2020 | Jin | H04L 63/1416 |
| 2012/0004945 | A1 | 1/2012 | Vaswani | |
| 2015/0365227 | A1 | 12/2015 | Billau et al. | |
| 2016/0294878 | A1* | 10/2016 | Jagana | H04L 67/34 |
| 2016/0364451 | A1 | 12/2016 | Barsness et al. | |
| 2020/0007385 | A1* | 1/2020 | Obaidi | G06N 20/00 |

OTHER PUBLICATIONS

IBM, "Graph Clause", [online], [Retrieved on Jun. 26, 2018]. Retrieved from the Internet at <URL: https://www.ibm.com/support/knowledgecenter/SSCRJU_4.1.1/com.ibm.streams.ref.doc/d>, IBM InfoSphere Streams Version 4.1.1, Total 2 pp.

ip.com, "Method and System for Policy Based Security and Compliance Management for Cloud Environments", Aug. 6, 2012, Ip.com No. IPCOM000220537D, retrieved from the Internet at <URL: https://ip.com/IPCOM/000220537>, Total 10 pp.

ip.com, "System and Method for End-to-End Regulatory Compliance in Customer Support", May 15, 2013, IP.com No. IPCOM000227768D, retrieved from the Internet at <URL: https://ip.com/IPCOM/000227768>, Total 5 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 30 pp.

Mell, P. and T. Grance, "The NIST Definition of Cloud Computing (Draft)", Sep. 2011, Computer Security Division Information Technology Laboratory National Institute of Standards and Technology, Total 7 pp.

Teachprivacy, "HIPAA Training Requirements: HIPAA Text—TeachPrivacy", [online], [Retrieved on Jul. 27, 2018]. Retrieved from the Internet at <URL: http://teachprivacy.com/hipaa-training-requirements-hipaa-text/>, © 2018 Teachprivacy, Total 6 pp.

Trcek, D., "An Integral Framework for Information Systems Security Management", Computers & Security vol. 22, No. 4, pp. 337-360, 2003, Copyright ©2003 Elsevier Ltd, Total 24 pp.

U.S. Department of Health & Human Services, "Methods for De-identification of PHI | HHS.gov", [online], [Retrieved on Jun. 2, 2018]. Retrieved from the Internet at <URL: https://www.hhs.gov/hipaa/for-professionals/privacy/special-topics/de-identification/index.html>, Content last reviewed on Nov. 6, 2015, Total 27 pp.

Security Standards Council, LLC, "PCI Security Standards Council", [online], [Retrieved on Jul. 30, 2018]. Retrieved from the Internet at <URL: https://www.pcisecuritystandards.org/pci_security/>, Copyright © 2006-2018 PCI Security Standards Council, LLC, Total 7 pp.

Gilmer, E., "Privacy and Security of Patient Data in the Cloud", [online], [Retrieved on Jul. 30, 2018]. Retrieved from the Internet at <URL: https://www.ibm.com/developerworks/cloud/library/cl-hipaa/>, published on Oct. 23, 2012, updated Apr. 16, 2013, Total 32 pp.

Arkenea, "Top 11 HIPAA Compliant Hosting Servers for Healthcare Apps in 2018", [online], [Retrieved on Jul. 30, 2018]. Retrieved from the Internet at <URL: http://arkenea.com/blog/top-hipaa-compliant-hosting-servers/>, Copyright 2017 Arkenea, Total 11 pp.

Payment Card Industry (PCI) Data Security Standard, "Requirement and Security Assessment Procedures", Version 3.2.1, May 2018, © 2006-2018 PCI Security Standards Council, LLC., pp. 1-70.

Payment Card Industry (PCI) Data Security Standard, "Requirement and Security Assessment Procedures", Version 3.2.1, May 2018, © 2006-2018 PCI Security Standards Council, LLC., pp. 71-139.

* cited by examiner

```
                           ┌─ 300
composite M (output  K,  L;   input  G, H)  {
   graph  stream<int32  x>  I  =  Functor(G)       {  /*..O..*/  }
          stream<int32  x>  J  =  Functor(H)       {  /*..P..*/  }
          stream<int32  x>  K  =  Custom(I;   J)   {  /*..Q..*/  }
          stream<int32  x>  L  =  Functor(J)       {  /*..R..*/  }
}
composite Main  {
   graph  stream<int32  x>  A  =  Beacon()  {}
          stream<int32  x>  B  =  Beacon()  {}
          (stream<int32  x>  C;   stream<int32  x>  D)  =  M(A; B)  { }
          (stream<int32  x>  E;   stream<int32  x>  F)  =  M(A; B)  { }
}
```

OPERATOR ISOLATION BASED ON DATA SECURITY REQUIREMENTS

FIELD

Embodiments of the invention relate to operator isolation based on data security (e.g., regulatory) requirements.

BACKGROUND

Conventional systems may be tasked with processing data that has restrictions, such as the Protected Health Information (PHI) data involved with glucose monitoring of data for sugar in a health system that requires Health Insurance Portability and Accountability Act (HIPAA) compliance or credit card data processing requiring Payment Card Industry (PCI) compliance.

In conventional systems, developers have to work with these security considerations and uniquely design applications to work in complicated configurations, where the application data considerations burden the developers and administrators. Some conventional systems may provide features required to operate in such environments.

However, the cost of operating in these environments is significantly higher than in generic cloud environments that are not fully compliant with these standards. Thus, current solutions that utilize a compliant cloud environment for such applications may be very expensive to create and maintain.

Also, in order to meet various compliance requirements, every employee working in the infrastructure has to be trained, resulting in delays and higher costs as the pool of available people for any problem is smaller. Furthermore, if a large amount of hardware is needed, the costs rise quickly as it is expensive to build large isolated portions of data centers.

Some conventional systems use de-identification. De-identification may be described as removing personal identifiers from data. For example, a medical record with identification information "John Smith" contains blood work information, etc. De-identification removes "John Smith" and replaces this identification information with a value that cannot tie back to the individual. This allows for research and statistical studies in the medical field to be conducted without violating HIPAA and patient privacy.

SUMMARY

In accordance with embodiments, a computer-implemented method is provided for operator isolation based on data security requirements. The computer-implemented method comprises: at a cloud node coupled to a tenant secure node and a tenant general node, receiving a graph that includes ingest portions of data and operators. For each of the operators, it is determined whether the operator processes protected data. In response to determining that the operator is tagged with an indication that the operator processes protected data, the operator is forwarded to the tenant secure node for processing. In response to determining that the operator is not tagged with an indication that the operator processes protected data, the operator is forwarded to the tenant general node for processing. Then, while the tenant general node is processing the operator, in response to determining that the operator is processing protected data, a tag is associated with the operator to indicate that the operator processes protected data and the operator is forwarded to the tenant secure node for processing.

In accordance with other embodiments, a computer program product is provided for operator isolation based on data security requirements. The computer program product comprising a computer readable storage medium having program code embodied therewith, the program code executable by at least one processor to perform operations comprising: at a cloud node coupled to a tenant secure node and a tenant general node, receiving a graph that includes ingest portions of data and operators. For each of the operators, it is determined whether the operator processes protected data. In response to determining that the operator is tagged with an indication that the operator processes protected data, the operator is forwarded to the tenant secure node for processing. In response to determining that the operator is not tagged with an indication that the operator processes protected data, the operator is forwarded to the tenant general node for processing. Then, while the tenant general node is processing the operator, in response to determining that the operator is processing protected data, a tag is associated with the operator to indicate that the operator processes protected data and the operator is forwarded to the tenant secure node for processing.

In yet other embodiments, a computer system is provided for operator isolation based on data security requirements. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: at a cloud node coupled to a tenant secure node and a tenant general node, receiving a graph that includes ingest portions of data and operators. For each of the operators, it is determined whether the operator processes protected data. In response to determining that the operator is tagged with an indication that the operator processes protected data, the operator is forwarded to the tenant secure node for processing. In response to determining that the operator is not tagged with an indication that the operator processes protected data, the operator is forwarded to the tenant general node for processing. Then, while the tenant general node is processing the operator, in response to determining that the operator is processing protected data, a tag is associated with the operator to indicate that the operator processes protected data and the operator is forwarded to the tenant secure node for processing.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments solve problems of conventional systems by determining what data is to be operated on in the secure environment. Then, embodiments allow, at run time, the specification of constraints that move portions of an application out of the secure network facility as soon as the data risk is proven to be mitigated.

Figure 1:
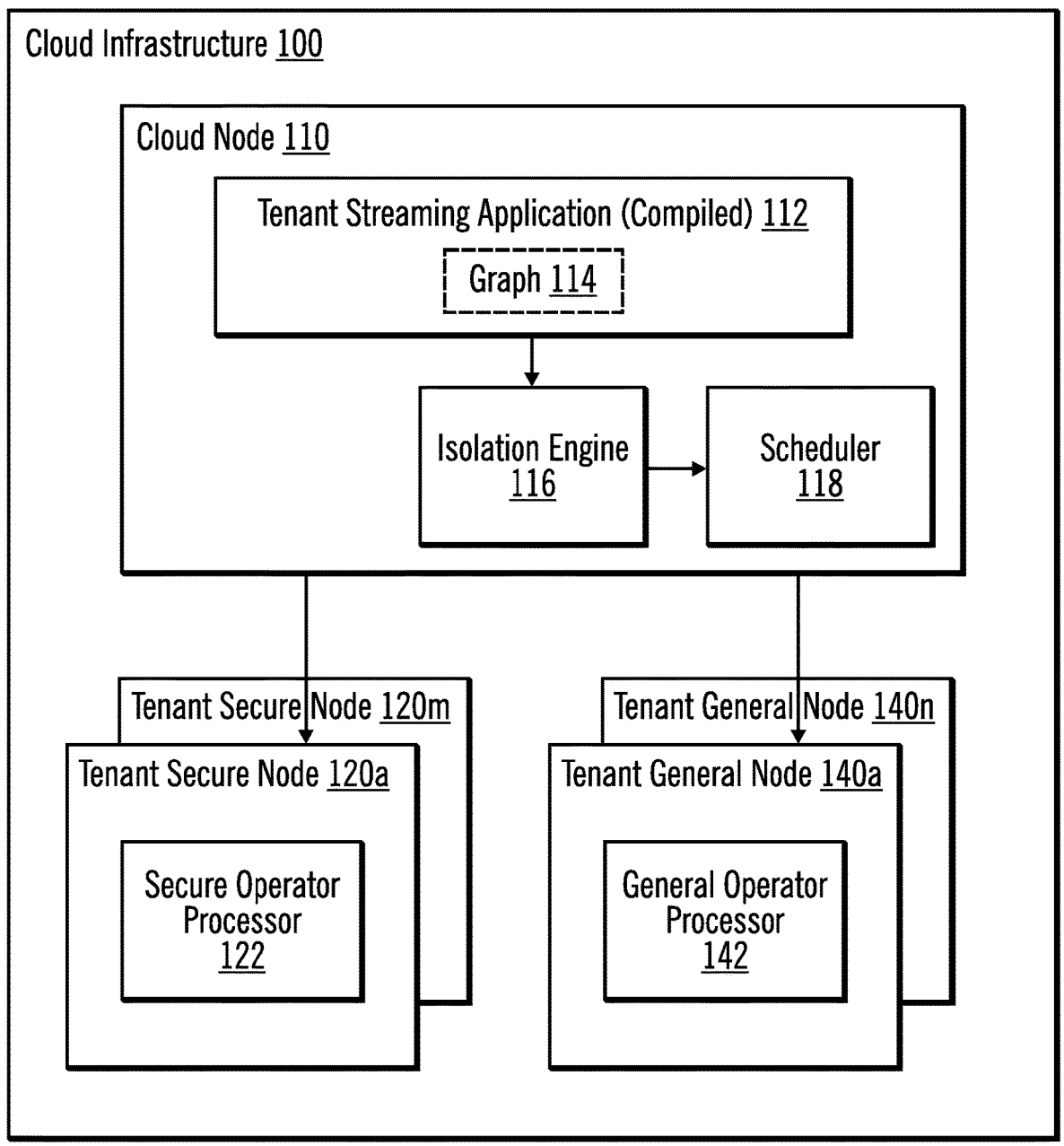
FIG. 1 illustrates, in a block diagram, a computing environment in accordance with certain embodiments.

FIG. 1 illustrates, in a block diagram, a computing environment in accordance with certain embodiments. In FIG. 1, a cloud infrastructure 100 includes a cloud node 110, one or more tenant secure nodes 120*a* . . . 120*m*, and one or more tenant general nodes 140*a* . . . 140*n*. The cloud node 110 includes a tenant streaming application 112 represented by a graph 114. The cloud node 110 also includes an isolation engine 116 and a scheduler 118. The cloud node 110 is coupled to the one or more tenant secure nodes 120*a* . . . 120*m* and the one or more tenant general nodes 140*a* . . . 140*n* in the cloud infrastructure 100 (which may include other components, such as other cloud nodes, other tenant secure nodes, and other tenant general nodes).

With embodiments, one or more secure tenant nodes 120*a* . . . 120*m* and one or more tenant general nodes 140*a* . . . 140*n* are assigned to a tenant (e.g., a customer or a user). However, unlike the tenant secure nodes 120*a* . . . 120*m*, the tenant general nodes 140*a* . . . 140*n* do not have the underlying compliance infrastructure setup (e.g., including operations employees with appropriate training) to ensure that pre-defined rules are being followed to process protected data. Thus, the tenant secure nodes 12*a* . . . 120*m* have the underlying compliance infrastructure setup to ensure that pre-defined rules are being followed to process protected data. Protected data may also be referred to as sensitive data or secure data. With embodiments, data is routed to a particular node 120*a* . . . 120*m* or 140*a* . . . 140*n* for processing.

In certain embodiments, the tenant streaming application 112 is a graph 114 of ingest portions of data and connected operators that typically flows left to right. Each operator in the graph 114 performs some function on the data and passes the processed data along to the next operator in the graph 114 until all operators have completed processing.

The isolation engine 116 routes operators that require secure processing to the tenant secure node 120 and routes other operators to the tenant general node. In certain embodiments, the isolation engine 116 provides information about whether an operator should be processed in a secure environment to the scheduler 118, and the scheduler routes the operator to one of the tenant secure nodes 120*a* . . . 120*m* or to one of the tenant general nodes 140*a* . . . 140*n*.

Each tenant secure node 120*a* . . . 120*m* includes a secure operator processor (such as secure operator processor 122 for tenant secure node 120*a*), while each tenant general node 140*a* . . . 140*n* includes a general operator processor (e.g., such as general operator processor 142 for tenant general node 140).

In certain embodiments, the developer writes the tenant streaming application 112 and compiles the tenant streaming application 112 to generate a Streams Application Bundle (SAB) file. This SAB file is then uploaded to the cloud node 110. If the SAB file does not contain operators with tags specifying PHI or PII data, the isolation engine 112 will default to running the SAB file in the tenant general node. A tag may be described as a property. However, even in this case, the general operator processor is looking for protected data patterns. If the general operator processor detects a pattern of secure information (e.g., a Social Security Number (SSN), the general operator processor relocates the operator to the tenant secure node automatically and auto-tags the operator as sensitive so that if the operator is seen by the isolation engine 116 subsequently, the isolation engine 116 will route the operator to the tenant secure node for processing.

In certain embodiments, when the tenant streaming application 112 is complied, an Application Description Language file (ADL file) is created. The ADL file may be described as a configuration file that describes processing elements, operators, and artifacts that make up the application. An ADL file is used to execute the compiled tenant streaming application 112. A processing element may be described as including one or more operators and a stream that are defined in a graph or a subgraph of a tenant streaming application 112. An operator may be described as a program that processes tuples in an incoming stream and produces an output stream as a result.

Figure 2:
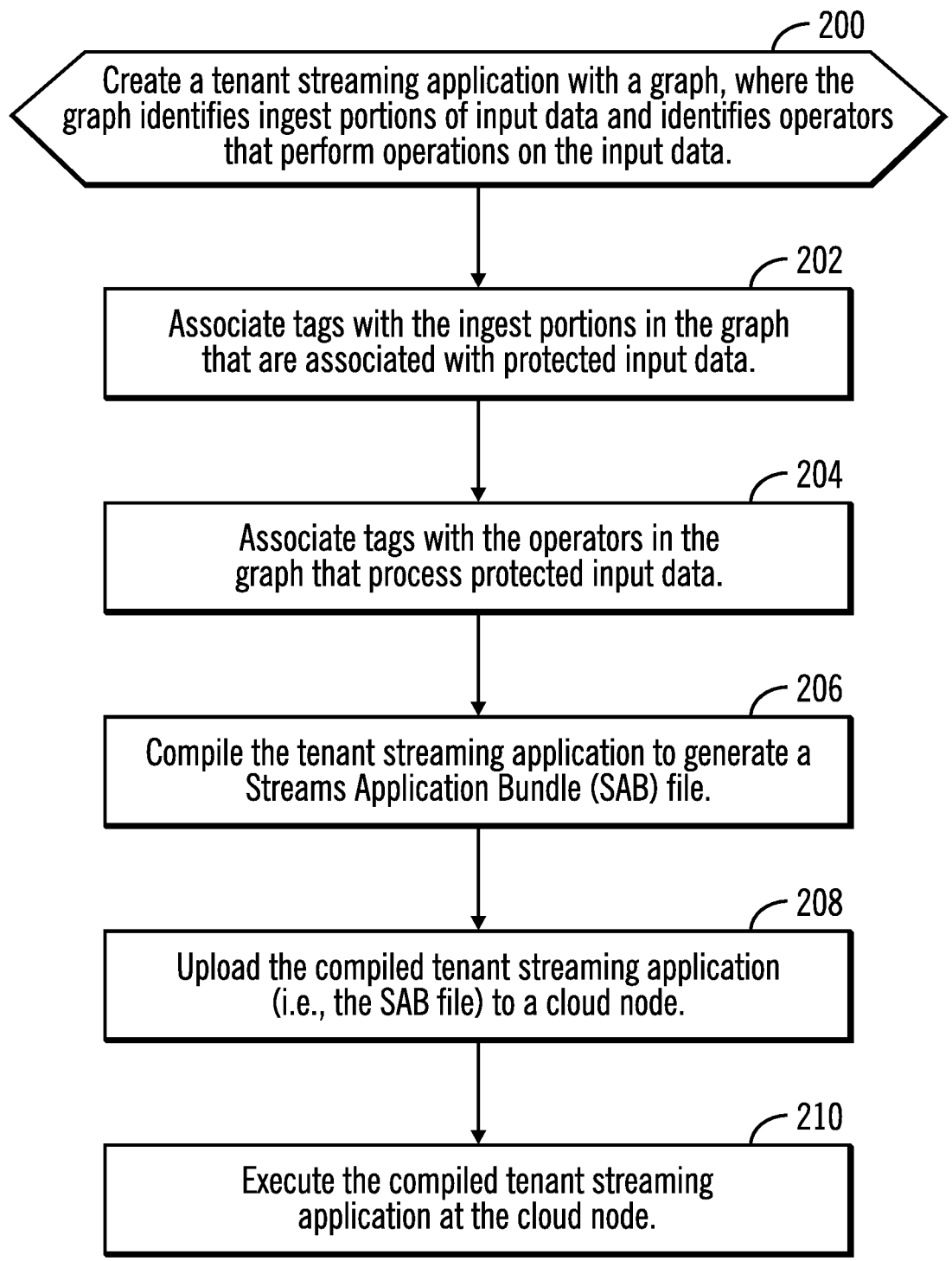
FIG. 2 illustrates, in a flow chart, operations for preparing a tenant streaming application in accordance with certain embodiments.

FIG. 2 illustrates, in a flow chart, operations for preparing the tenant streaming application 112 in accordance with certain embodiments. In block 200, a tenant streaming application is created with a graph, where the graph identifies ingest portions of input data and identifies operators that perform operations on the input data. In block 202, tags are associated with the ingest portions in the graph that are associated with protected input data (to identify the input data as protected input data). In certain embodiments, a developer or a system administrator creating the graph identifies operators for protected data and tags the ingest portions in the graph with PHIIngest or PII-Ingest tags. For example, the following are types of data sources that may garner these tags: credit card numbers, health images, social security numbers, etc.

In block 204, tags are associated with the operators in the graph that process protected input data. In certain embodiments, the application is developed in a normal manner by a developer. With embodiments, the developer is not required to specify where in the application that the information is de-identified to remove the identity of the subject form the data. However, the developer may provide tags for operators in the graph to indicate various operations that are processing protected information using a PHI tag or a PII tag. These PHI an PII tags of operators may be different from the tags of block 202 for ingest portions. The PHI and PII tags are used because there are different requirements for personal health information versus personal identifiable information. However, the tags may be implemented to use the same environment or may use multiple secure environments for processing the data.

In certain embodiments, no operators are tagged, but some protected data is tagged. While, in other embodiments, no protected data is tagged, but some operators are tagged. In yet other embodiments, protected data is tagged and some operations are tagged.

In block 206, the tenant streaming application (graph) is compiled to generate a Streams Application Bundle (SAB) file. In block 208, the compiled tenant streaming application (i.e., the SAB file) is uploaded to a cloud node (such as cloud node 110, which includes the isolation engine 116). In block 210, the compiled tenant streaming application is executed at the cloud node.

In certain embodiments, the application is submitted in a normal manner. Then, if the developer has not specified any tagging, the isolation engine 112 starts the operators for the application in the tenant secure node. If the developer has tagged one or more operators, the isolation engine 112 starts each tagged operator in the tenant secure node and starts each untagged ("open") operator in the tenant general node.

Figure 3:
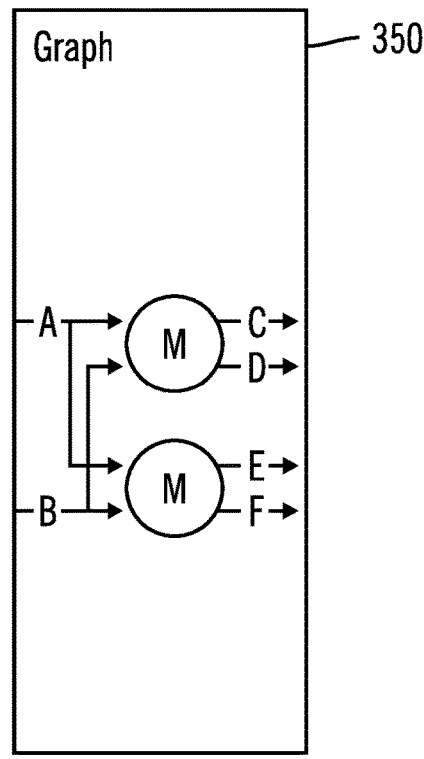
FIG. 3 illustrates a graph clause and a graph in accordance with certain embodiments.

FIG. 3 illustrates a graph clause and a graph in accordance with certain embodiments. In FIG. 3, a graph clause 300 is used to generate a graph 350.

Figure 4:
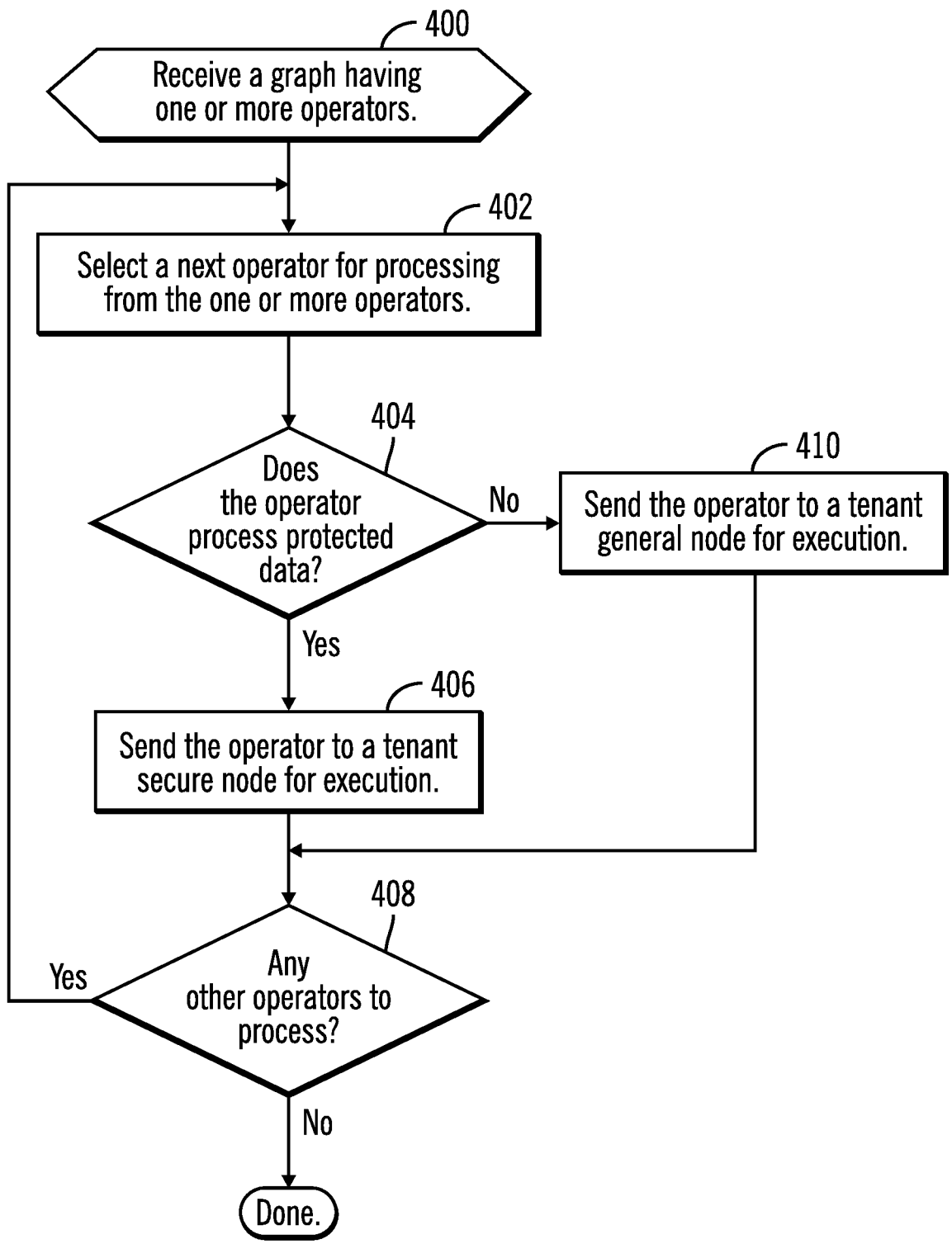
FIG. 4 illustrates, in a flow chart, operations performed by an isolation engine in accordance with certain embodiments.

FIG. 4 illustrates, in a flow chart, operations performed by an isolation engine 110 in accordance with certain embodiments. Control begins at block 400 with the isolation engine 116 receiving a graph having one or more operators. In block 402, the isolation engine 116 selects a next operator for processing from the one or more operators. In block 404, the isolation engine 116 determines whether the operator processes protected data. If so, processing continues to block 406, otherwise, processing continues to block 410.

In certain embodiments, the isolation engine 116 determines whether the operator processes protected data based on rule-based patterns and learned patterns. The rule-based patterns may be provided by a developer or system administrator. The learned patterns are identified by (i.e., "learned by") the isolation engine 116. For example, if a particular operator is found to process a field of data that provides identifying information (e.g., a business address) and is moved by the general operator processor to the secure operator processor, then the isolation engine 116 learns over time that the operator or any operator processing that field of data may need secure processing on the tenant secure node.

In block 406, the isolation engine 116 sends the operator to a tenant secure node for execution. In block 408, the isolation engine 116 determines whether there are any other operators to process in the graph. If so, processing continues to block 402, otherwise, processing is done.

In block 410, the isolation engine sends the operator to a tenant general node for execution. From block 410, processing continues to block 408.

Figure 5:
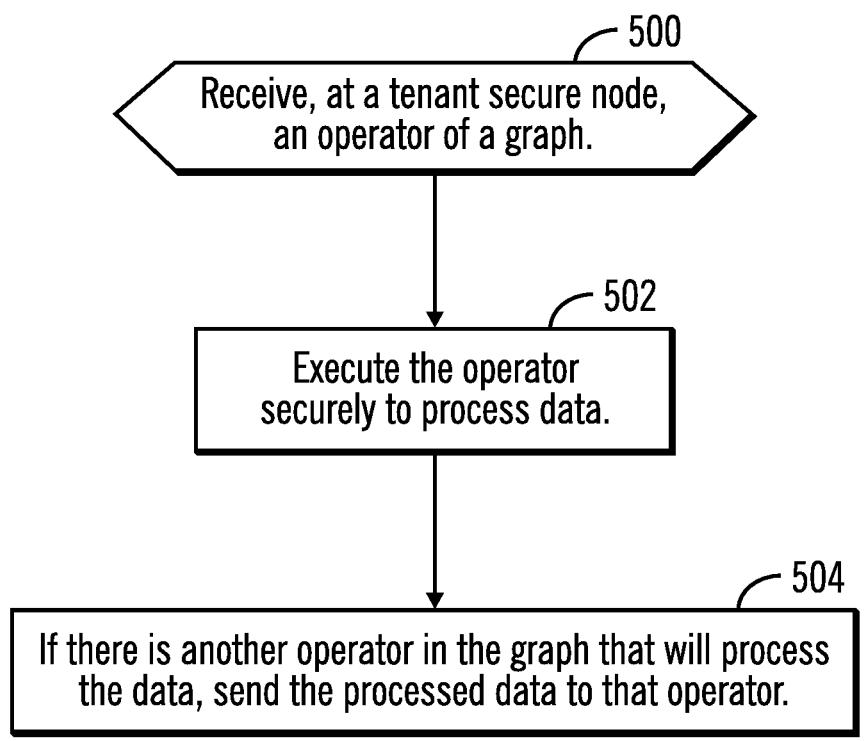
FIG. 5 illustrates, in a flow chart, operations performed at a tenant secure node in accordance with certain embodiments.

FIG. 5 illustrates, in a flow chart, operations performed at a tenant secure node in accordance with certain embodiments. Control begins at block 500 with the tenant secure node receiving an operator of a graph. In certain embodiments, the tenant secure node receives the operator from the isolation engine 116. In certain other embodiments, the tenant secure node receives the operator from the general operator processor of the tenant general node 140. In block 502, the secure operator processor of the tenant secure node executes the operator securely to process data. Secure processing includes underlying compliance infrastructure to ensure that pre-defined rules are being followed to process protected data. In block 504, if there is another operator in the graph that will process the data, the secure operator processor sends the processed data to that operator In certain embodiments, if the processed data contains sensitive information, then that operator is processed in the secure environment (i.e., at a tenant secure node).

For example, if there are three operators in the graph to process the data, the first operator processes the data and sends the processed data to a second operator. Then, the second operator receives the data processed from the first operator, processes the data further, and sends the further processed data to a third operator. The third operator receives the further processed data from the second operator, and processes the data yet further. Since there are no other operators to process that data, processing is complete in this example.

Figure 6:
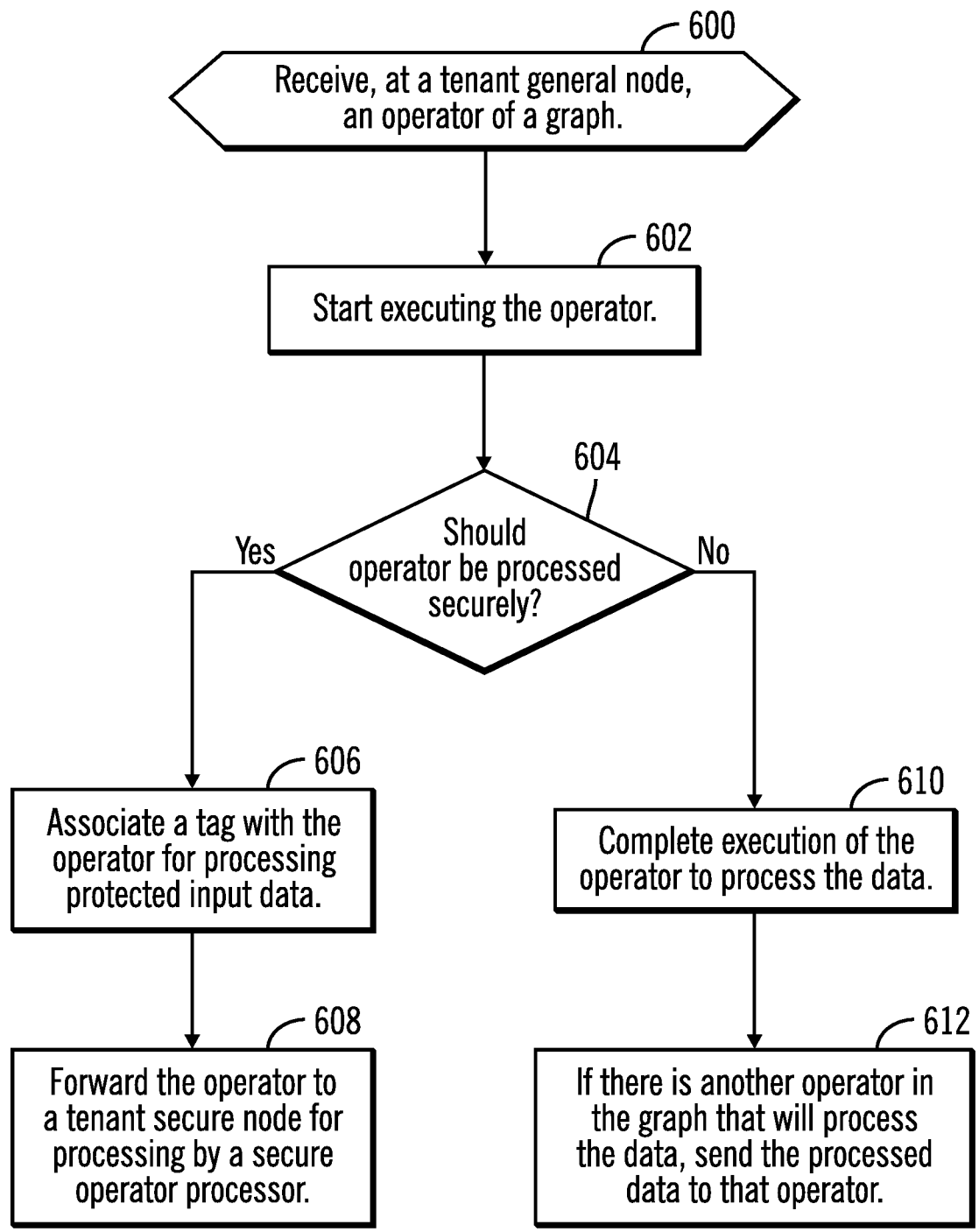
FIG. 6 illustrates, in a flow chart, operations performed at a tenant general node in accordance with certain embodiments.

FIG. 6 illustrates, in a flow chart, operations performed at a tenant general node in accordance with certain embodiments. Control begins at block 600 with the tenant general node 140 receiving an operator of a graph from the isolation engine 116. In block 602, the general operator processor of the tenant general node 140 starts executing the operator to process data.

In block 604, the general operator processor determines whether the operator should be processed securely. If so, processing continues to block 606, otherwise, processing continues to block 610.

In certain embodiments, the general operator processor determines whether the operator should be processed securely based on rule-based patterns and learned patterns. The rule-based patterns may be provided by a developer or system administrator. The learned patterns are identified by (i.e., "learned by") the general operator processor. For example, if a particular operator is found to process a field of data that provides identifying information (e.g., a business address), the general operator processor may route that operator to the secure operator processor for processing.

In block 606, the general operator processor associates a tag with the operator for processing protected input data. In block 608, the general operator processor forwards the operator to the tenant secure node for processing by the secure operator processor.

In block 610, the general operator processor completes execution of the operator to process the data. In block 612, if there is another operator in the graph that will process the data, the general operator processor sends the processed data to that operator.

As performance allows, the isolation engine 112 runs comparisons against data feeds looking to see when the tuples containing protected information have been hashed/encrypted/scrubbed. Embodiments use this to relocate operators from the tenant general node to the tenant secure node and to encrypt or remove the protected data on the tenant general node until the relocation of the operator to the tenant secure node is complete.

The isolation engine 112 moves one or more operators after the sanitization of data outside the tenant secure node to reduce costs.

In certain embodiments, if the isolation engine 112 detects any violation of the scrubbing, which is constantly monitored, the isolation engine 112 moves the one or more operators from into the tenant secure node without transmitting any protected data outside of the tenant secure node (In this example, the operator was not tagged, but the isolation engine 116 detected protected data. With embodiments, the isolation engine 116 informs a scheduler, which automatically tags the operator as sensitive and moves the operator to the tenant secure node. Embodiments perform live relocation without stopping execution of the application.

In certain embodiments, if the tenant general node 140 comes across protected data, the tenant general node 140 transfers the protected data to the tenant secure node.

In certain embodiments, protected data is held at a security barrier and the protected data is replayed once the operator is moved back into the tenant secure node. Embodiments provide consistent regions for resiliency of tenant streaming application 112 by providing the ability to recover from failures. These regions are described as consistent because the tenant streaming application 112 runtime periodically establishes a consistent state for a given sub-graph (i.e., a region of the graph). The consistent state includes persisted operator states that are consistent with having processed all tuples up to a certain logical point. On a failure, a region (sub-graph) is reset to its last successfully persisted state, and source/start operators of the region may replay any tuples submitted after the restored state. In most use cases, this replay enables applications to achieve an exactly-once tuple processing semantic. With certain embodiments, the replay facilities within the tenant streaming application include consistent regions so that the process-once nature of the application is preserved.

The secure boundary Machine Language (ML) layer is consistently fed any attempted protected data egress violations to better refine the model for current and future application executions. The ML layer may be implemented in transport code for the tenant streaming application, and the transport code interacts with the isolation engine 116. The ML layer may stores rule (e.g., provided by users) for identifying protected data and protected operators and also learns new rules based on what types of data and operators are processed as protected data or protected operators. For example, one rule for protected data may indicate that data in the form of "xxx-xx-xxxx" indicates a social security number. As more users create rules, the isolation engine 116 learns what may be protected data so that no single cloud tenant has to create every rule. The boundary may be configured not to place operators back into the tenant secure node if they do not meet a violation threshold. For example, 5% of data containing PII is acceptable and will not trigger replacement.

Embodiments allow for streaming applications with strict compliance requirements for portions of the data to be launched in a mixed compliant (e.g., secure)/non-compliant (e.g., public) distributed infrastructure. The portions of the distributed streaming application that process the Public Health Information (PHI) data and Personally Identifiable Information (PII) data are placed in the compliant infrastructure. Other portions of the processing that are used for analytic analysis, aggregation, etc. are placed in the non-compliant sections of the infrastructure. This off-loading allows for more processing of protected data requiring compliance to be processed on less hardware with less development/operations personnel trained in various compliance requirements. In addition, handling of this private or protected data typically requires additional logging controls and other security controls, which also add expense to running the workload. If the critical PHI/PII data is required to meet these requirements, implementing these additional controls where needed will also save cost. The overall result is the reduction of cost when securely processing controlled data while maintaining regulatory compliance.

Embodiments provide mechanisms in streaming applications executed during run time that route data and place operators according to the data privacy and security compliance requirements at various stages of distributed execution.

Embodiments address the need for data protection in multi-tenant distributed environments where protected Health Information (PHI) data and Personally Identifiable Information (PII) data resides or flows.

Thus, certain embodiments provide element isolation based on processing data regulatory requirements. Embodiments solve the problem of protected data, compliance, and regulation in distributed applications. More specifically, embodiments detect and optimally process protected data in a distributed streams application.

Embodiments allows the detection of protected information using known rule-based and learned patterns Then, embodiments permit or do not permit data in certain zones. For example, operators may be tagged with PII, PHI, etc. And, certain parts (e.g., nodes) of the cloud infrastructure 100 or data center may be tagged with PII-compliant, PHI-compliant, etc. As data flows through the graph, the insolation engine 116 analyzes the pattern. If the isolation engine 116 detects a pattern of protected data, embodiments relocate the operator processing the data to a compliant zone. In certain embodiments, any combination of the tenant secure nodes 120a . . . 120m may be considered to form a zone that processes certain protected data and/or protected operators. In such embodiments, a particular operator may be forwarded to a tenant secure node 120 in a particular zone.

For example, if a graph has three operators. A→B→C, each is a processing element (PE). PE-A, PE-B, PE-C and each gets placed on different tenant general nodes in the tenant's node pool (not the tenant secure nodes because the operators of this example are not tagged). Then, a pattern of protected data (e.g., xxx-xx-xxxx) is detected in PE-A. The, that PE is moved to the secure environment of a tenant secure node and is blocked from outputting the protected data to PE-B. Now, PE-A is on a tenant secure node. The tenant nodes are: s[PE-A]→PE-B→PE-C. PE-A may send unprotected data from the secure node environment back to the regular tenant node.

Embodiments deal with mixed protected and non-protected (public) data in a distributed computing environment. Embodiments provide for different compliant zones based on tagging. Then, embodiments detect protected data (via rule-based and pattern based learning). When protected data is detected, embodiments determine the highest required sensitivity zone, and then relocate the operator to that zone.

Figure 7:
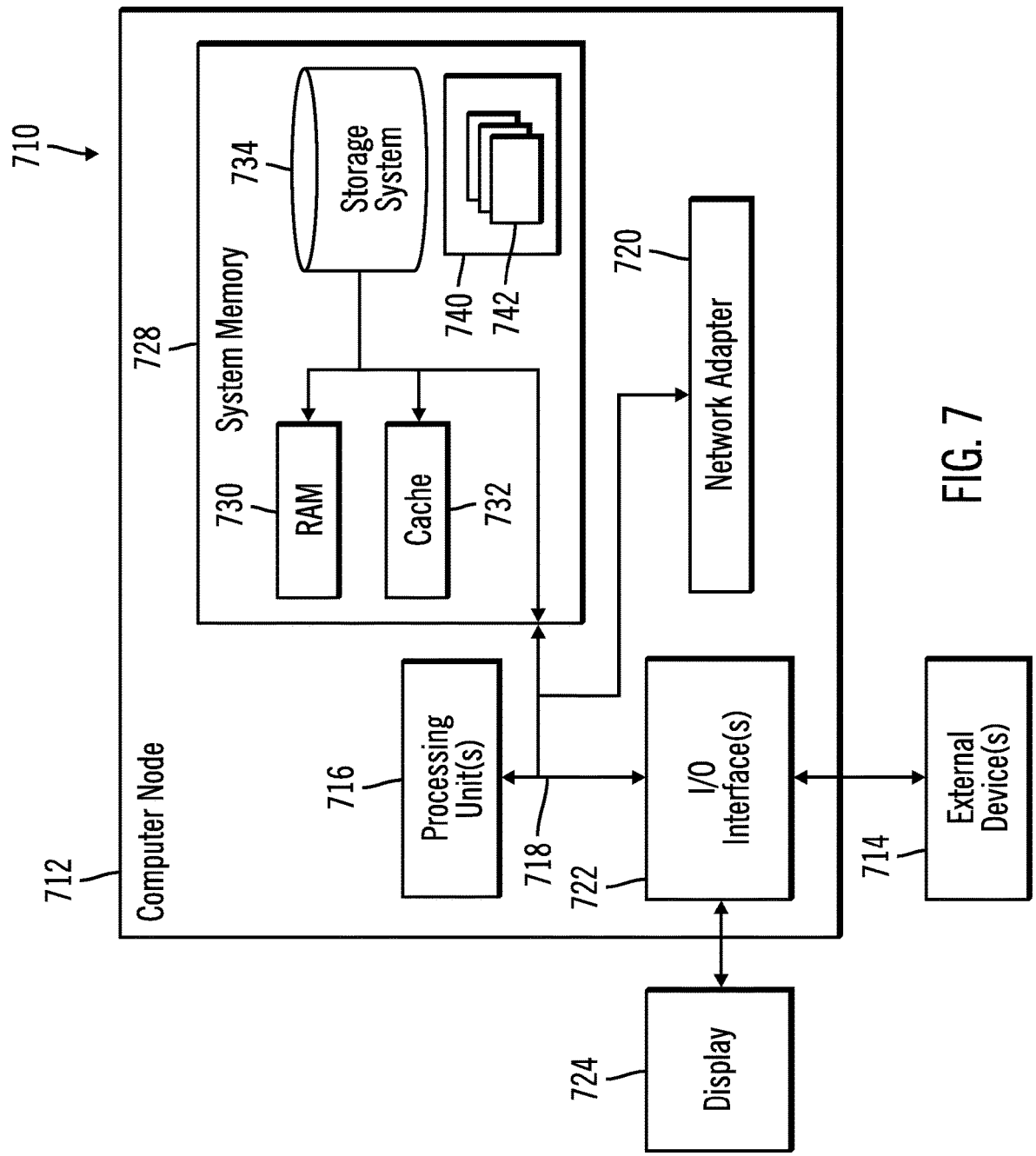
FIG. 7 illustrates a computing node in accordance with certain embodiments.

FIG. 7 illustrates a computing environment 710 in accordance with certain embodiments. In certain embodiments, the computing environment is a cloud computing environment. Referring to FIG. 7, computer node 712 is only one example of a suitable computing node and is not intended to suggest any limitation as to the scope of use or functionality of embodiments of the invention described herein. Regardless, computer node 712 is capable of being implemented and/or performing any of the functionality set forth hereinabove.

The computer node 712 may be a computer system, which is operational with numerous other general purpose or special purpose computing system environments or configurations. Examples of well-known computing systems, environments, and/or configurations that may be suitable for use with computer node 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 712 may be described in the general context of computer system executable instructions, such as program modules, being executed by a computer system. Generally, program modules may include routines, programs, objects, components, logic, data structures, and so on that perform particular tasks or implement particular abstract data types. Computer node 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer node 712 is shown in the form of a general-purpose computing device. The components of computer node 712 may include, but are not limited to, one or more processors or processing units 716, a system memory 728, and a bus 718 that couples various system components including system memory 728 to one or more processors or processing units 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 712 typically includes a variety of computer system readable media. Such media may be any available media that is accessible by computer node 712, and it includes both volatile and non-volatile media, removable and non-removable media.

System memory 728 can include computer system readable media in the form of volatile memory, such as random access memory (RAM) 730 and/or cache memory 732. Computer node 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, system memory 728 may include at least one program product having a set (e.g., at least one) of program modules that are configured to carry out the functions of embodiments of the invention.

Program/utility 740, having a set (at least one) of program modules 742, may be stored in system memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer node 712 may also communicate with one or more external devices 714 such as a keyboard, a pointing device, a display 724, etc.; one or more devices that enable a user to interact with computer node 712; and/or any devices (e.g., network card, modem, etc.) that enable computer node 712 to communicate with one or more other computing devices. Such communication can occur via Input/Output (I/O) interfaces 722. Still yet, computer node 712 can communicate with one or more networks such as a local area network (LAN), a general wide area network (WAN), and/or a public network (e.g., the Internet) via network adapter 720. As depicted, network adapter 720 communicates with the other components of computer node 712 via bus 718. It should be understood that although not shown, other hardware and/or software components could be used in conjunction with computer node 712. Examples, include, but are not limited to: microcode, device drivers, redundant processing units, external disk drive arrays, RAID systems, tape drives, and data archival storage systems, etc.

In certain embodiments, the cloud node 110, each tenant secure node 120a . . . 120m, and each tenant general node 140a . . . 140n each has the architecture of computer node 712.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
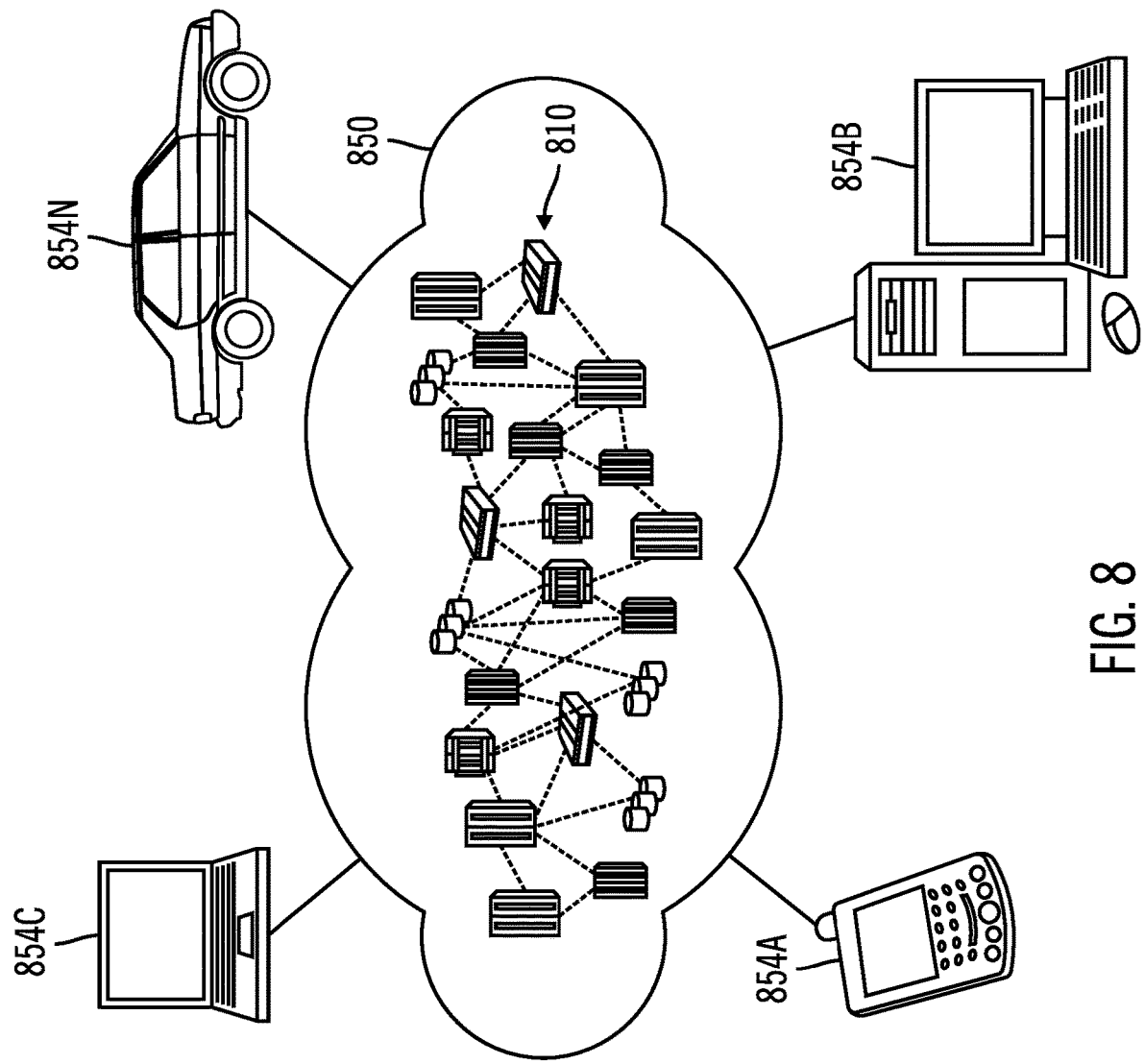
FIG. 8 illustrates a cloud computing environment in accordance with certain embodiments.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
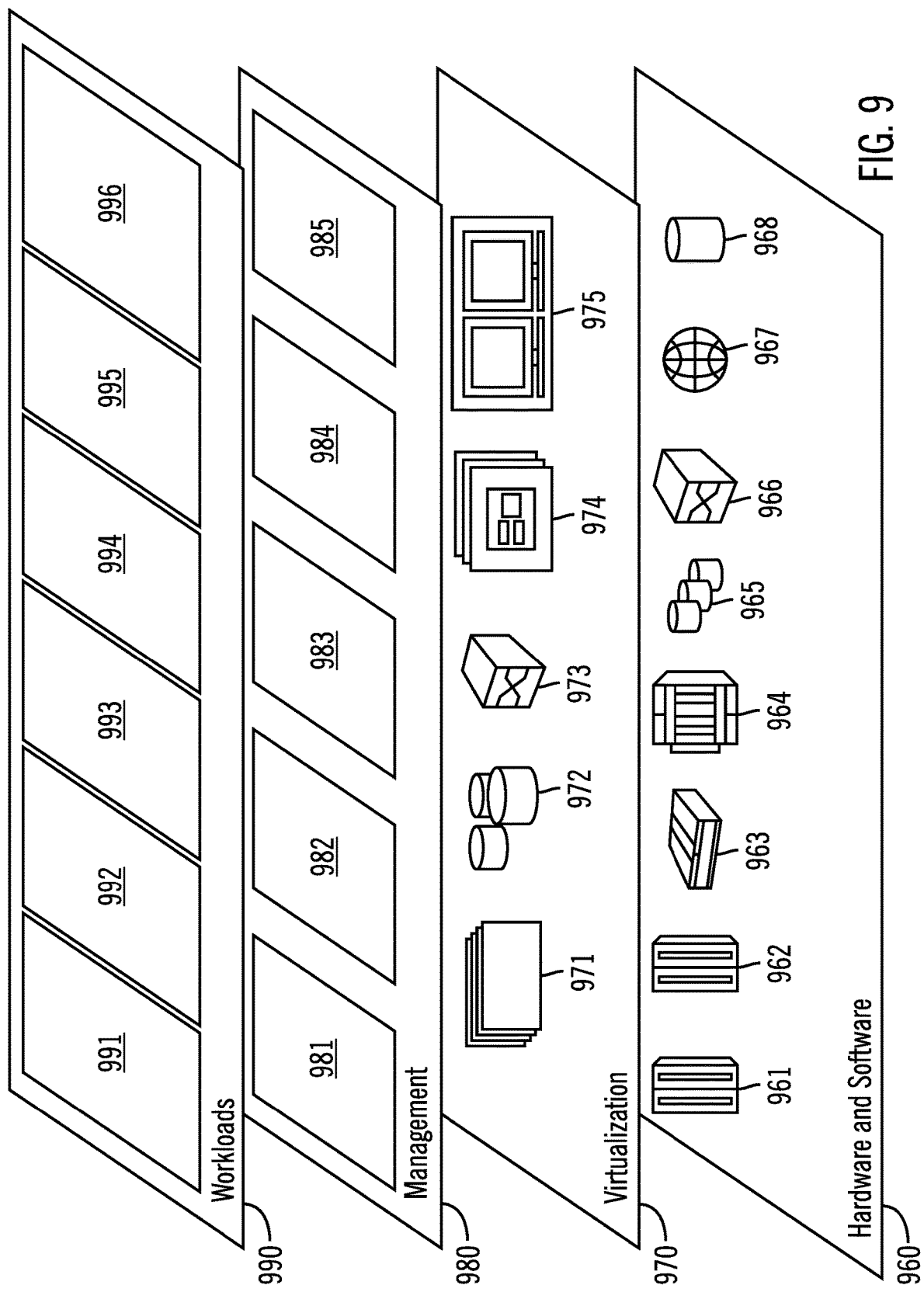
FIG. 9 illustrates abstraction model layers in accordance with certain embodiments.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and operator isolation based on data security requirements 996.

Thus, in certain embodiments, software or a program, implementing operator isolation based on data security requirements in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising operations for:
   at a cloud node coupled to a tenant secure node and a tenant general node,
      receiving a graph that includes ingest portions of data and operators;
      for each of the operators,
         determining whether the operator is tagged with an indication that the operator processes protected data;
         in response to determining that the operator is tagged with the indication that the operator processes protected data, forwarding the operator to the tenant secure node for processing;
         in response to determining that the operator is not tagged with the indication that the operator processes protected data, forwarding the operator to the tenant general node for processing; and
         while the tenant general node is processing the operator,
            determining whether the operator is processing protected data;
            in response to determining that the operator is processing protected data,
               associating a tag with the operator to indicate that the operator processes protected data; and
               forwarding the operator to the tenant secure node for processing; and
            in response to determining that the operator is not processing protected data, processing the operator at the tenant general node.

2. The computer-implemented method of claim 1, further comprising operations for:
   associating a tag with an ingest portion of data of the ingest portions of data to indicate that the data for the ingest portion is protected data.

3. The computer-implemented method of claim 1, wherein the tag associated with the operator is for one of personal health information and personal identifiable information.

4. The computer-implemented method of claim 1, further comprising operations for:
   using at least one of rule-based patterns and learned patterns to determine whether each of the operators processes protected data.

5. The computer-implemented method of claim 1, wherein the graph is for a tenant streaming application that is compiled to generate a Streams Application Bundle (SAB) file.

6. The computer-implemented method of claim 1, wherein the tenant secure node has an underlying compliance infrastructure to ensure that pre-defined rules are being followed to process the protected data.

7. The computer-implemented method of claim 1, wherein a Software as a Service (SaaS) is configured to perform the operations of the computer-implemented method.

8. A computer program product, the computer program product comprising a computer readable storage medium having program code embodied therewith, the program code executable by at least one processor to perform operations for:
   at a cloud node coupled to a tenant secure node and a tenant general node,
      receiving a graph that includes ingest portions of data and operators;
      for each of the operators,
         determining whether the operator is tagged with an indication that the operator processes protected data;
         in response to determining that the operator is tagged with the indication that the operator processes protected data, forwarding the operator to the tenant secure node for processing;
         in response to determining that the operator is not tagged with the indication that the operator processes protected data, forwarding the operator to the tenant general node for processing; and
         while the tenant general node is processing the operator,
            determining whether the operator is processing protected data;
            in response to determining that the operator is processing protected data,
               associating a tag with the operator to indicate that the operator processes protected data; and
               forwarding the operator to the tenant secure node for processing; and
            in response to determining that the operator is not processing protected data, processing the operator at the tenant general node.

9. The computer program product of claim 8, wherein the program code is executable by the at least one processor to perform operations for:
   associating a tag with an ingest portion of data of the ingest portions of data to indicate that the data for the ingest portion is protected data.

10. The computer program product of claim 8, wherein the tag associated with the operator is for one of personal health information and personal identifiable information.

11. The computer program product of claim 8, wherein the program code is executable by the at least one processor to perform operations for:
    using at least one of rule-based patterns and learned patterns to determine whether each of the operators processes protected data.

12. The computer program product of claim 8, wherein the graph is for a tenant streaming application that is compiled to generate a Streams Application Bundle (SAB) file.

13. The computer program product of claim 8, wherein the tenant secure node has an underlying compliance infrastructure to ensure that pre-defined rules are being followed to process the protected data.

14. The computer program product of claim 8, wherein a Software as a Service (SaaS) is configured to perform the operations of the computer program product.

15. A computer system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more computer-readable memories, to perform operations comprising:
    at a cloud node coupled to a tenant secure node and a tenant general node,
       receiving a graph that includes ingest portions of data and operators;
       for each of the operators,
          determining whether the operator is tagged with an indication that the operator processes protected data;

in response to determining that the operator is tagged with the indication that the operator processes protected data, forwarding the operator to the tenant secure node for processing;

in response to determining that the operator is not tagged with the indication that the operator processes protected data, forwarding the operator to the tenant general node for processing; and while the tenant general node is processing the operator,
- determining whether the operator is processing protected data;
- in response to determining that the operator is processing protected data,
  - associating a tag with the operator to indicate that the operator processes protected data; and
  - forwarding the operator to the tenant secure node for processing; and
- in response to determining that the operator is not processing protected data, processing the operator at the tenant general node.

16. The computer system of claim 15, wherein the operations further comprise:
associating a tag with an ingest portion of data of the ingest portions of data to indicate that the data for the ingest portion is protected data.

17. The computer system of claim 15, wherein the tag associated with the operator is for one of personal health information and personal identifiable information.

18. The computer system of claim 15, wherein the operations further comprise:
using at least one of rule-based patterns and learned patterns to determine whether each of the operators processes protected data.

19. The computer system of claim 15, wherein the graph is for a tenant streaming application that is compiled to generate a Streams Application Bundle (SAB) file.

20. The computer system of claim 15, wherein a Software as a Service (SaaS) is configured to perform the operations of the computer system.

* * * * *